INVENTOR.
RUSSELL C. FERBITZ
STANLEY E. CHOCHOLEK
BY
Strauch, Nolan & Neale
ATTORNEYS

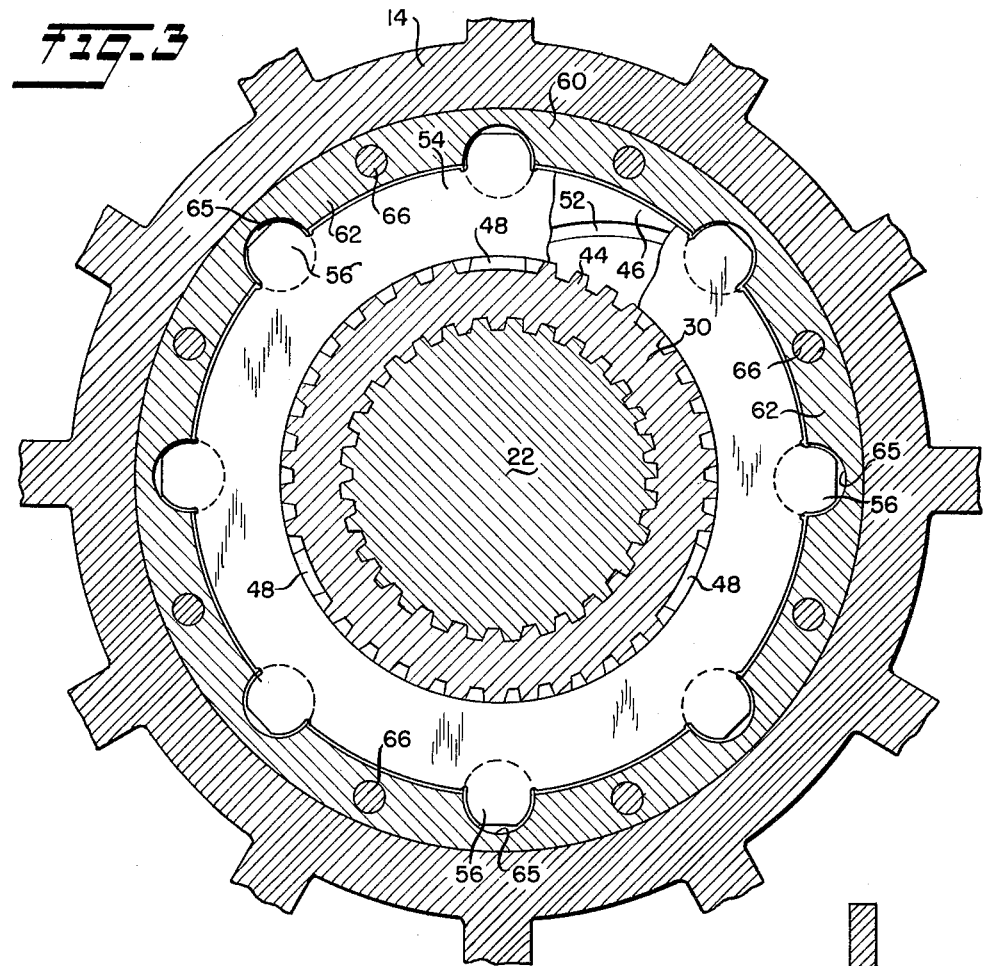
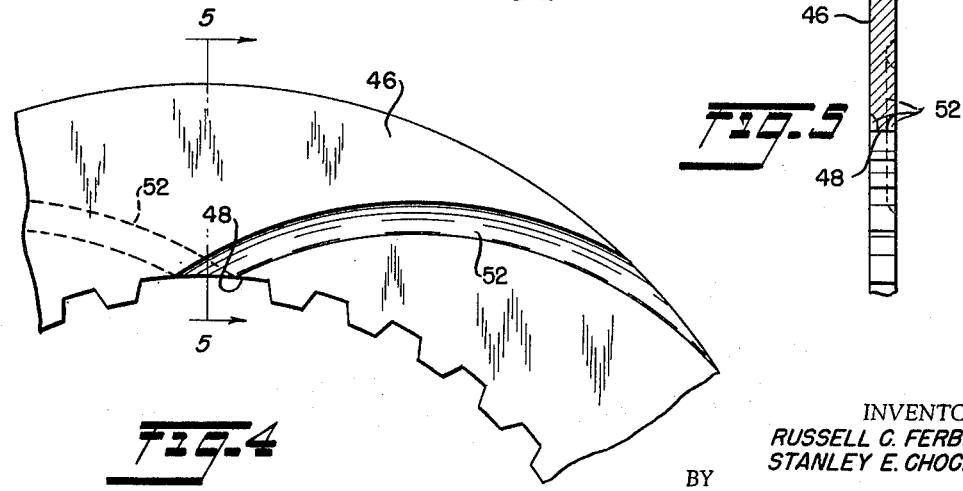

Aug. 9, 1966  R. C. FERBITZ ET AL  3,264,901
LIMITED SLIP DIFFERENTIAL

Filed May 22, 1964  3 Sheets-Sheet 3

INVENTORS
RUSSELL C. FERBITZ
& STANLEY E. CHOCHOLEK

Strauck, Nolan & Neale
ATTORNEYS

United States Patent Office 3,264,901
Patented August 9, 1966

---

3,264,901
LIMITED SLIP DIFFERENTIAL
Russell C. Ferbitz, Clawson, and Stanley E. Chocholek, Madison Heights, Mich., assignors, by mesne assignments, to Rockwell-Standard Corporation, a corporation of Delaware
Filed May 22, 1964, Ser. No. 369,505
7 Claims. (Cl. 74—711)

The present invention refers to differential mechanisms such as employed in interaxle or final drives of automotive vehicles and more particularly to differentials including means for reducing or eliminating the differential action.

Many proposals have been made to reduce or entirely eliminate differential action under adverse driving conditions in automotive differential mechanisms. This can be accomplished by entirely deactivating the differential through manually activated lock-out devices. This imposes a burden on the driver to know when to lock or unlock the differential and to remember to do so. Other structures may provide automatic cam or friction means or a combination of both to lock-out the differential or retard differential action when one wheel loses traction. Such devices are usually complicated, expensive and subject to rapid wear. Still other means are known in which retarding agents (such as heavy oil, silicones, etc.) are employed to prevent differential action automatically under certain circumstances. However, fluid filled differentials are difficult to seal and pose design problems which must be solved to provide the exact amount of space to enable the fluid to become an effective retarding agent.

In conventional type limited slip differentials employing friction clutches the clutches are usually engaged by loaded springs or other devices. Engagement, however, is such as to allow a limited differentiating action under full traction condition as when, for instance, the vehicle negotiates a turn. On the other hand, when one wheel loses traction the side thrust set up by the separating forces of the meshed gears adds more load to the clutches in addition to the pre-designed friction load and thus locks the axle drive shafts to the case halves and prevents any differential action. The amount of increased torque necessary to overcome this friction load is then available at the wheel having traction and thus the vehicle may be moved. However, the fact that the friction clutches in these known type locking differentials are always engaged, although most of the time a locking of the differential is not needed, subjects the clutch discs to extreme wear so that they have to be replaced frequently. Also, when wear sets in, the clutch assemblies start to chatter and become noisy. Furthermore, constant engagement of the friction clutches produces a parasitic drag under normal operating conditions which wastes power and reduces the performance of the vehicle. Thus, engagement of the friction clutches at all time is highly objectionable.

In another type of konwn locking differential the friction force to lock the differential when one wheel loses traction is created by thrust on the opposite side, that is, the side with the wheel having traction. In these differentials the locking mechanism is normally disengaged so that the gear mechanism can freely differentiate. However, when one wheel loses traction and tries to turn considerably faster than the other wheel the teeth of a dog tooth type clutch tend to separate thereby producing an axial movement which is transferred to the opposite side gear by a thrust pin, collar, or other means to bring this side gear in contact with the clutch faces of the casing and thus lock the gear to the case. In this differential a friction force is created on the side opposite from the side which lost traction and thus the vehicle may be able to be moved. Although friction wear in this type differential is minimal since the clutches engage only when needed and immediately disengage when the need for locking has passed it is objectionable in that a considerable amount of wheel spinning must be present first in order to separate the dog teeth clutch a sufficient amount to exert thrust in such proportion as to be able to lock the differential. Furthermore, it requires the provision of dog teeth clutches and a thrust transfer device in addition to the friction clutch means which add to the weight and cost of the assembly.

The present invention is concerned with novel automatic differential lock-out or retarding means which eliminate the inherent disadvantages of such prior structures.

Accordingly, it is an object of the present invention to provide novel wholly automatic friction means to lock-out or retard differential action of an automotive differential only when one or both wheels lose traction.

Another object is the provision of novel friction retarding means within a differential case which allows differential action when both wheels have equally good traction but which immediately prevents differentiating when one or both wheels lose traction.

Still another object is the provision in a differential of a disc type clutch between the side gears and the differential houisng to introduce friction in such a way as to transfer torque from one wheel to the other when one wheel loses traction.

Other objects and novel features will become evident by the following detailed description in connection with the attached drawings in which:

FIGURE 3 is an enlarged transverse section through one of the friction clutches along line 3—3 of FIGURE 1;

FIGURE 4 is an enlarged fragmentary plan view of one of the driven clutch discs showing the arrangement of oil grooves for lubrication;

Figure 2:
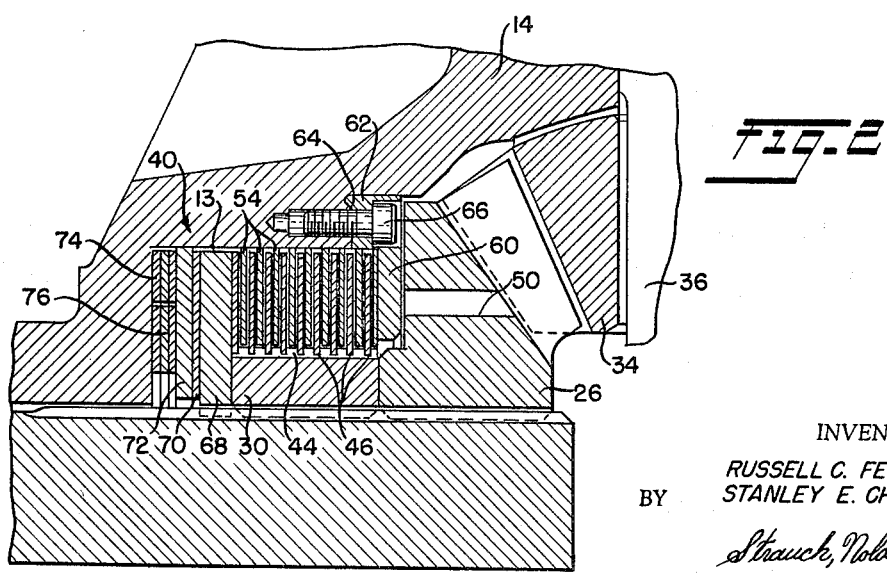
FIGURE 2 is an enlarged section of one of the disc clutch units of FIGURE 1 shown in released position.
Figure 6:
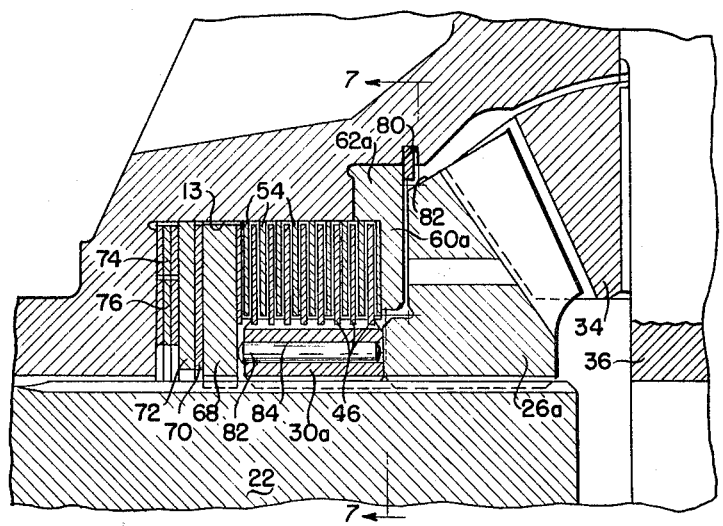
Figure 7:
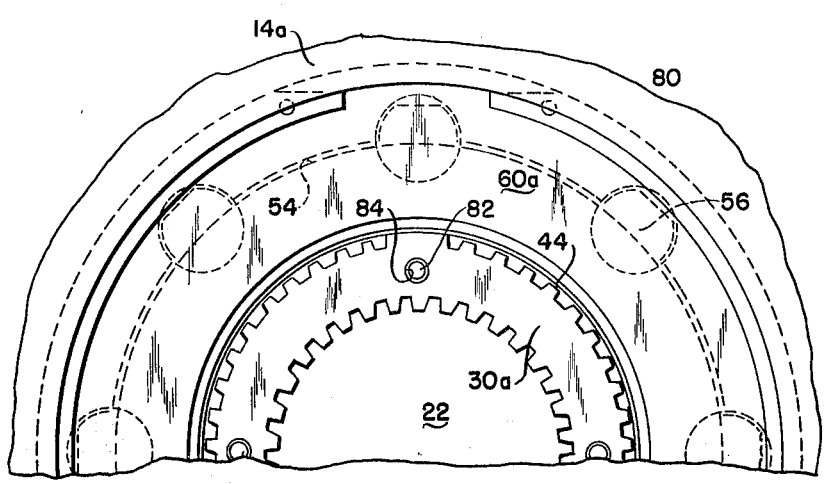

FIGURE 5 is an enlarged fragmentary section through the clutch plate along line 5—5 of FIGURE 4; and FIGURES 6 and 7 are views similar to FIGURES 2 and 3, respectively, illustrating another embodiment of the invention.

Although the present invention is illustrated as being incorporated in a truck or passenger car driving axle it will be understood that it may also be employed in interaxle or third differentials such as used in multi-wheel driven vehicles.

Figure 1:
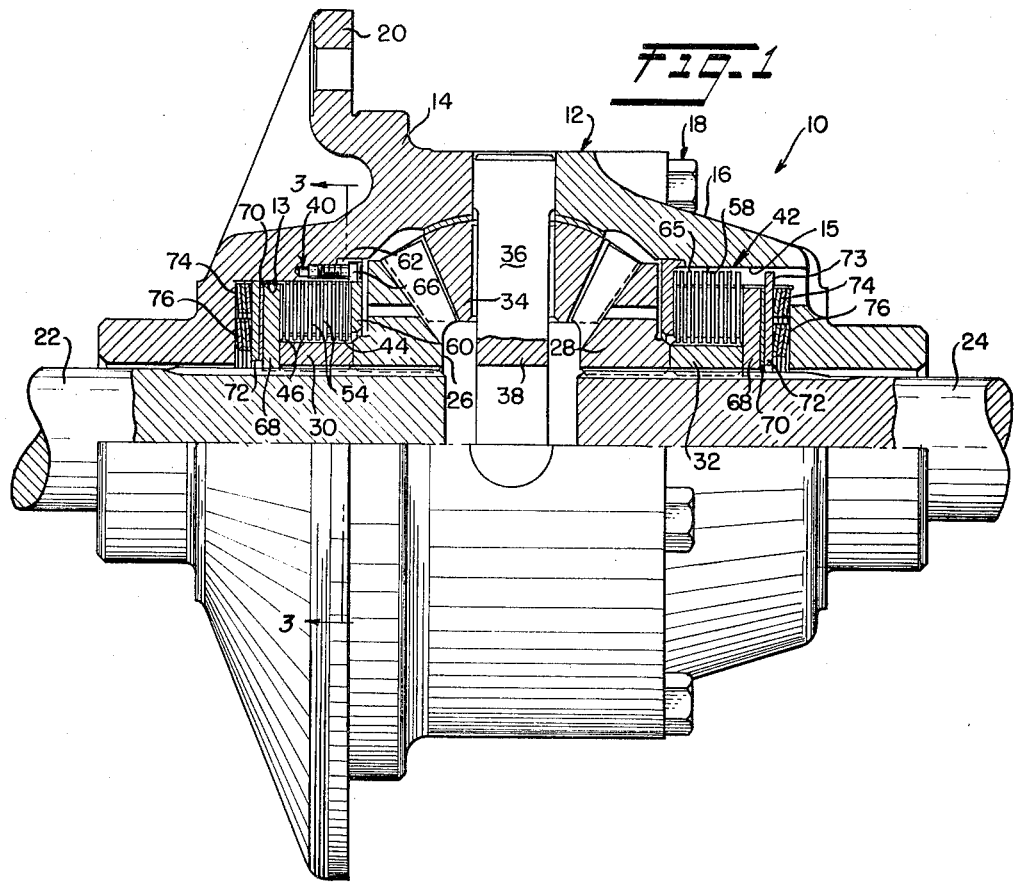
FIGURE 1 is a longitudinal vertical half-section through an automotive differential mechanism embodying the present invention.

With reference to FIGURE 1, 10 indicates a differential gear mechanism usually installed in the gear carrier of a vehicle drive axle (not shown). Differential gear mechanism 10 is enclosed in a casing 12 which may be made of parts 14 and 16 secured together by bolts 18. One case half 14 may have a flange 20 for attachment to the usual driving ring gear (not shown). The casing halves 14 and 15 are axially aligned and bored through to receive axle drive shafts 22 and 24 which are splined to receive identical bevel side gears 26 and 28 which abut collars 30 and 32, respectively, which are also splined to the axle shafts. The side gears 26 and 28 and their associated collars 30 and 32 may be made in one piece instead of separate where it is more convenient.

The side gears 26 and 28 mesh with a number of pinions 34 located between the side gears and supported for rotation on the arms 36 of a spider 38 clamped between the two differential casing halves 14 and 16 for rotation therewith.

Associated with each side gear 26 and 28 are friction clutch assemblies 40 and 42, respectively, contained within recessed sections 13 and 15 of the casing halves 14 and 16. Since the friction clutch assemblies 40 and 42 are identical it will suffice to describe only one.

Collar 30 is externally splined at 44 to receive a number of spaced driven clutch discs 46. As best shown in FIGURES 3–5, a number of splines between the collar 30 and clutch discs 46 are omitted to provide axial passages 48 to allow lubricant to pass there along from a number of axial bores 50 through the face of the side gear 26. The driven clutch discs 46 have a number of curved oil grooves 52 extending from the passages 48 on both sides of the discs in opposite directions towards the outer edge of the discs to assure even distribution of the lubricant.

Interposed between the driven clutch discs 46 are a number of driving clutch discs 54 which have a number of tangs 56 (FIGURE 3) on their outer diameter which fit in correspondingly spaced cast or milled slots 58 in the casing half 14 to be rotatable therewith. It will be understood that the other half 16 is also equipped with slots to receive the associated driving clutch discs of clutch 42.

The pack of clutch discs is retained by a ring 60 which has an annular projection 62 which fits into a corresponding recess 64 in the case half 14. The ring retainer may be secured to the case by socket head screws 66. The retainer rings 60 also have slots 65 aligned with the slots 58 to receive the tangs 56 of the innermost plates 54. Outwardly the pack of clutch discs is retained by a rigid plate 68 which abuts the outer end of the collar 30 and is splined to the axle shaft 22.

It will be noticed that the clutch pack assembly is restrained from axial movement inwardly by the stationary ring retainer 60 against which the clutch discs will be compressed for engagement. However, axial movement of the clutch discs outwardly to disengaged position is permitted by the splined connection of the plate 68 to the axle shaft.

A thrust washer 70 separates a pressure plate 72 from the retainer plate 68. Pressure plate 72 is provided with tangs 73 received in the slots 58 and is thus rotatable with the casing. The pressure plate 72 abuts the crown surfaces of two stacks of nested Belleville type plate springs 74 and 76. Any desired number of plate springs or one large heavy plate spring instead of the pack of springs shown may be used in any particular application depending on the amount of pre-load spring force needed for that particular application.

The plate springs 74 and 76 normally press the pressure plate 72 against the clutch retainer plate 68, thereby moving the collar 30 and side gear 26 inwardly towards the center of the differential, and also compressing the clutch discs 46 and 54 into engagement and against the stationary retainer ring 60, thus locking the axle shaft 22 to the casing 14. This position of the parts is shown in FIGURE 1 and represents the normal initial position at start or when the vehicle is standing.

The operation of the differential will now be considered.

As stated earlier, the friction clutches 40 and 42 are normally engaged when the vehicle is stationary and at the initial stage of movement by means of the springs 74 and 76. Upon movement of the vehicle the casing 12 will be rotated and with it the pinions 34 which drive the side gears 26 and 28 to rotate the axle shafts 22 and 24. However, as the vehicle starts to move, wheel torque builds up and creates a separating force between the intermeshing teeth of the pinions and side gears which tends to shift the side gears axially outwardly along the axle shaft splines. In conventional non-locking differentials the outwardly directed side gear thrust is taken by thrust washers between the side gear and the differential case and in known locking differentials of the friction clutch type this same side gear thrust is used to load the friction clutches and thereby lock the differential. However, as explained earlier, constant clutch engagement by preload means side gear thrust or otherwise is not desirable because of the high rate of wear, parasitic friction drag, heating and chatter. Furthermore, in such devices which depend primarily on friction induced by side gear thrust proportional to axle shaft torque, the clutch torque is highest when the wheels have best traction and it is obvious that under such conditions a locking or limited slip differential is needed the least.

The differential of the present invention provides the opposite effect, that is, instead of loading the friction clutches as wheel torque increases they will be unloaded for all normal driving conditions when the wheels have good traction. Thus, differentiating is available under normal conditions so as not to influence maneuverability of the vehicle, as is the case in other known devices which induce steady friction load. The friction clutches in the present invention are only fully engaged when starting the vehicle or when one wheel loses traction temporarily.

This is accomplished in the following manner:

When the differential case 12 does not rotate, that is, when the vehicle is stationary, the friction clutches 40 and 42 are engaged due to the compression of the plates between the stationary retainer ring 60 and the axially movable outer retainer plate 68 by the force of the springs 74 and 76. This position is illustrated in FIGURE 1. When the vehicle starts to move, wheel torque tends to create a separating force at the gear teeth of the intermeshing pinion and side gears which shifts the side gears outwardly an amount in proportion to the torque available. The side gears 26 and 28 are allowed to shift outwardly a certain amount in contrast to conventional differentials in which side gear movement is restricted by abutment of the back face of the side gears against thrust washers or friction surfaces on the casing parts 14 and 16. This shifting of the side gears, when subjected to torque load, is restricted to an amount which is not detrimental to the proper functioning and life of the differential gearing.

Outward movement of the side gears 26 and 28 due to driving torque causes the collars 30 and 32 to be shifted also, which in turn exert pressure on the outer retainer plates 68 to move them outwardly against the forces of the springs 74 and 76, thereby reducing or completely releasing axial pressure on the clutch discs 46 and 54. This position of the mechanism is illustrated in FIGURE 2. Thus, during driving and when both wheels have sufficient traction, the friction clutches 40 and 42 will be disengaged or their load will be considerably reduced, depending on the available torque, to allow unrestricted differentiating action without parasitic friction torque drag when the vehicle negotiates turns.

However, if one wheel loses traction due to poor road conditions, the torque available at that wheel which lost traction will be reduced, reducing the separating force between the pinions and the side gears 26 and 28. The force of the springs 74, 76 will then overcome the separating force and displace the outer retainer plates 68, together with the associated side gear and collar assembly, inwardly, which again will cause the clutch discs to be compressed thus introducing a friction force. The same low torque available at the wheel which lost traction will also only be available at the other wheel due to the inherent characteristic of the differential to divide torque equally and consequently that clutch also will be engaged in the same manner as described above. Thus, with both clutches engaged both axle shafts will rotate in unison enabling the vehicle to move off the low traction surface.

As soon as both wheels again regain traction, under sufficient wheel torque, the separating forces of the gear teeth act once more to displace the side gears 26 and 28 outwardly to release the clutches for normal driving.

The embodiment of FIGURES 6 and 7, which will now be considered in detail, differs from the previously described embodiment in certain structural details which reduce the cost of manufacture and increase its durability and responsiveness. The components of the previously described system which are incorporated in the embodiments of FIGURES 6 and 7 without change are indicated by the same reference numerals as used above.

In the embodiment of FIGURES 6 and 7 the clutch retaining rings 60a are held in place by snap ring retainers 80 received in grooves in the differential cage halves, FIGURE 6 illustrating the cage half 14a modified for this purpose. To provide clearance for the snap ring 80 the side gear 26a is chamfered as at 82. Similar modification has been made in the opposite side gear.

The embodiment of FIGURES 6 and 7 also incorporates revised structure for transmitting side thrust from the side gears to the outer retainer plate 68. This function is performed by a plurality, for example, four, thrust pins 82 which are axially slidable in bores 84 in the collar 30a. As shown in FIGURE 6 the pins 82 are slightly longer than the thickness of the collar 30a and their opposite ends abut the side gear 26a and the outer retaining ring 68. Accordingly, the clutches can be released or engaged upon axial movement of the side gears 26 and 28 without requiring movement of the collar 30a. Since the resistance to axial movement of the pins 82 is considerably less than the resistance to similar movement of the splined collar 30a, the embodiment of FIGURES 6 and 7 is subject to less wear and is immediately responsive to lateral displacement of the side gears 26 and 28.

From the foregoing it will be obvious that a vehicle may easily be moved from a standing position even if one or both driving wheels have poor traction, since the friction clutches are initially engaged as shown in FIGURE 1 and will stay engaged as long as a low traction condition at the wheels exists, thus enabling the vehicle to be moved.

It will be seen that the present novel differential mechanism requires only minor modifications of a conventional differential, mostly in the internal structure of the differential case. However, the outside dimensions of the differential case remain substantially unchanged in order to fit into existing carrier designs.

The spring load needed to effectively apply the clutch means can be predetermined for various application requirements by changing the number or size of the springs in the assembly.

It will be appreciated that the novel arrangement for disengaging the clutches under normal driving conditions considerably reduces wear, prevent chatter and heating of the clutch and eliminates excessive strain on the gearing. In addition it will be found that manuverability of the vehicle during normal operations is in no way affected by the present novel differential mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A limited slip differential mechanism comprising a driven casing, a plurality of pinions carried by said casing, a pair of aligned output shafts rotatably carried by said casing, side gears meshing with said pinions, said side gears being drivingly connected to the inner ends of said shaft and mounted for axial movement thereon, a pair of clutch assemblies within said casing, each adapted, when engaged, to lock one of said shafts to said casing, means constantly spring urging said clutch assemblies toward engaged positions, and means responsive to the application of driving torque to said casing to release said clutches.

2. A limited slip differential mechanism comprising a driven casing, a plurality of pinions carried by said casing, a pair of aligned output shafts rotatably carried by said casing, side gears drivingly connected to said pinions and to the inner ends of said shafts and mounted for axial movement thereon, said side gears being moved axially of said shaft when driving torque is applied to said casing, a pair of clutch assemblies within said casing, each adapted, when engaged, to lock one of said shafts to said casing, spring means constantly urging said clutch assemblies toward engaged positions, and means responive to the axial movement of said side gears when driving torque is applied to said casing to disable said spring means and release said clutches.

3. A limited slip differential mechanism comprising a driven casing, a plurality of pinions carried by said casing, a pair of aligned output shafts rotatably carried by said casing, side gears meshing with said pinions, said side gears being drivingly connected to the inner ends of said shafts and mounted for axial movement thereon, said side gears being moved axially apart when driving torque is applied to said casing, a pair of disc clutch assemblies, each clutch assembly surrounds one of said shafts outwardly of its associated side gear, said disc clutch assemblies each having one set of discs non-rotatably connected to said casing and another set of discs non-rotatably connected to one of said shafts, spring means interposed between said casing and the outer ends of said clutch assemblies for constantly urging said clutch assemblies into engaged position to lock said shafts to said casing, and means movable with said side gears for disabling said springs to release said clutches when driving torque is applied to said casing.

4. A limited slip differential mechanism comprising a driven casing, a plurality of pinions carried by said casing, a pair of aligned output shafts rotatably carried by said casing, side gears meshing with said pinions, said side gears being drivingly connected to the inner ends of said shafts and mounted for axial movement thereon, said side gears being moved axially apart when driving torque is applied to said casing, a pair of disc clutch assemblies mounted in surrounding relation with said shafts outwardly of said side gears, said clutch assemblies each having one set of discs non-rotatably connected to said casing and another set of discs non-rotatably connected to one of said shafts, relatively fixed abutments carried by said casing adapted to support the inner ends of the respective clutch assemblies, spring means interposed between said casing and the outer ends of said clutch assemblies for constantly urging said clutch assemblies toward said abutments into engaged position to lock said shaft to said casing, and means movable with said side gears for disabling said springs to release said clutches when driving torque is applied to said casing.

5. The combination according to claim 4 wherein said last-mentioned means includes release members interposed between said springs and other ends of said clutch assemblies, and means connecting said release members and said side gears.

6. The combination according to claim 5 wherein said release members include rings positioned between said spring means and said clutch discs and collars interposed between said rings and said side gears.

7. The combination according to claim 5 wherein said release members include rings positioned between said spring means and said clutch discs and a plurality of pins interposed between said rings and said side gears.

References Cited by the Examiner

UNITED STATES PATENTS 1,481,889  1/1924  Carhart ---------- 74—711 X
2,821,096  1/1958  Lyeth ------------- 74—711

FOREIGN PATENTS 237,133  1/1962  Australia.

DAVID J. WILLIAMOWSKY, *Primary Examiner.*
J. A. WONG, *Assistant Examiner.*